(12) United States Patent
Yonekubo et al.

(10) Patent No.: US 11,086,135 B2
(45) Date of Patent: Aug. 10, 2021

(54) OPTICAL MODULE AND HEAD-MOUNTED DISPLAY APPARATUS

(71) Applicant: SEIKO EPSON CORPORATION, Tokyo (JP)

(72) Inventors: Masatoshi Yonekubo, Suwa-gun Hara-mura (JP); Hiroyuki Tatsugi, Chino (JP); Hidemitsu Sorimachi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 230 days.

(21) Appl. No.: 16/456,043

(22) Filed: Jun. 28, 2019

(65) Prior Publication Data

US 2020/0004034 A1    Jan. 2, 2020

(30) Foreign Application Priority Data

Jun. 29, 2018    (JP) .............................. JP2018-124444

(51) Int. Cl.
*G02B 27/14* (2006.01)
*G02B 5/04* (2006.01)

(52) U.S. Cl.
CPC ............. *G02B 27/149* (2013.01); *G02B 5/04* (2013.01)

(58) Field of Classification Search
CPC ................................ G02B 27/149; G02B 5/04
USPC .......................... 359/629, 630, 634; 345/7–9
See application file for complete search history.

(56) References Cited

U.S. PATENT DOCUMENTS

| 6,137,635 A | 10/2000 | Nakazawa |
| 6,280,037 B1 * | 8/2001 | Smith ................. H04N 9/3105 353/31 |

FOREIGN PATENT DOCUMENTS

| JP | H08-069062 A | 3/1996 |
| JP | H08-076075 A | 3/1996 |
| JP | 2000-39584 A | 2/2000 |
| JP | 2000-267045 A | 9/2000 |
| JP | 2005-308937 A | 11/2005 |

* cited by examiner

*Primary Examiner* — William Choi
(74) *Attorney, Agent, or Firm* — Oliff PLC

(57) ABSTRACT

An optical module according to the present disclosure includes a cross dichroic prism, a first display panel, a second display panel, a third display panel, a first adhesive layer configured to bond the first display panel to the cross dichroic prism, a second adhesive layer configured to bond the second display panel to the cross dichroic prism, and a third adhesive layer configured to bond the third display panel to the cross dichroic prism. At least one of the first adhesive layer, the second adhesive layer, and the third adhesive layer includes a spacer member.

5 Claims, 7 Drawing Sheets

OPTICAL MODULE AND HEAD-MOUNTED DISPLAY APPARATUS

The present application is based on, and claims priority from JP Application Serial Number 2018-124444, filed Jun. 29, 2018, the disclosure of which is hereby incorporated by reference herein in its entirety.

BACKGROUND

1. Technical Field

The present disclosure relates to an optical module and a head-mounted display apparatus.

2. Related Art

A technique is known in which a cross dichroic prism is combined with three display panels as an optical module that synthesizes R, G, and B image light each emitted from three display panels (see, for example, JP-A-2000-39584). With this optical module, intervals between the display panels and the cross dichroic prism are set to predetermined values by disposing glass plates between each of the display panels and the cross dichroic prism.

However, in this optical module, there is a problem in that variations in the flatness of the glass plates and the thickness of adhesive layers for bonding the glass plates arise, therefore intervals between the display panels and the cross dichroic prism cannot be adjusted with precision.

SUMMARY

An optical unit according to one aspect of the disclosure includes a cross dichroic prism, a plurality of display panels, and adhesive layers configured to bond corresponding ones of the plurality of display panels to the cross dichroic prism, wherein the adhesive layers include spacer members that regulate intervals between each of the plurality of display panels and the cross dichroic prism to predetermined values.

In the optical unit according to the above-described aspect, the plurality of display panels may include a first display panel and a second display panel, the adhesive layers may include a first adhesive layer configured to bond the first display panel and including a first spacer member, and a second adhesive layer configured to bond the second display panel and including a second spacer member, the first spacer member may be constituted by a plurality of first spherical members, the second spacer member may be constituted by a plurality of second spherical members, and diameters of the first spherical members may be different from diameters of the second spherical members.

In the optical unit according to the above-described aspect, the plurality of display panels may include a first display panel and a second display panel, the adhesive layers may include a first adhesive layer configured to bond the first display panel and including a first spacer member, and a second adhesive layer configured to bond the second display panel and including a second spacer member, the first spacer member may be constituted by a plurality of first spherical members, the second spacer member may be constituted by a plurality of second spherical members, and diameters of the plurality of first spherical members may differ in each bonding region of the first display panel.

In the optical unit according to the above-described aspect, the diameter of the plurality of second spherical members may differ in each bonding region of the second display panel.

In the optical unit according to the above-described aspect, the spacer member may be disposed in a region not overlapping, in a plan view, with a display region of the display panel.

A head-mounted display apparatus according to one aspect of the disclosure includes the optical module according to the above-described aspect, and a projection optical system configured to project light from the optical module into an eye of a user.

DESCRIPTION OF EXEMPLARY EMBODIMENTS

Exemplary embodiments of the disclosure will be described below using the drawings. Note that, in each of the drawings below, constituent elements are illustrated on different dimensional scales to increase the visibility of each constituent element.

Exemplary Embodiment 1

A head-mounted display apparatus according to this exemplary embodiment is an example of a head-mounted display used while worn on a head of a user.

In the description below, the term "head-mounted display" is abbreviated as "HMD".

Figure 1:
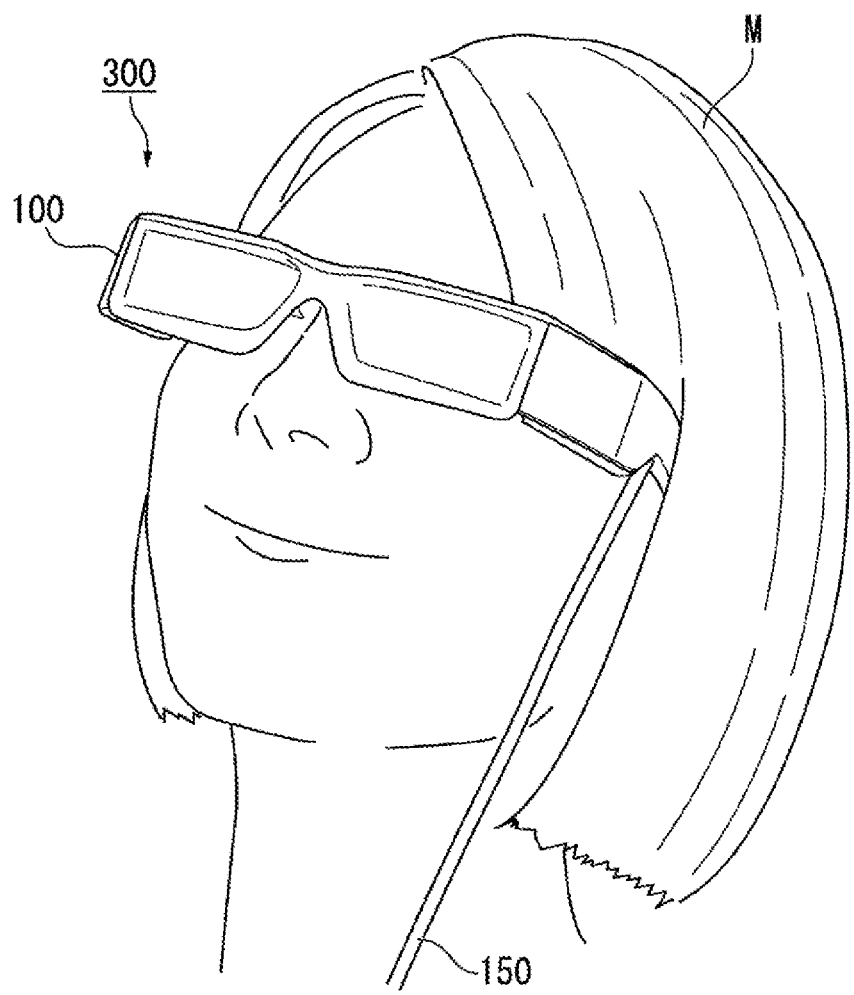
FIG. 1 is a diagram illustrating a user wearing an HMD according to Exemplary Embodiment 1.
Figure 2:
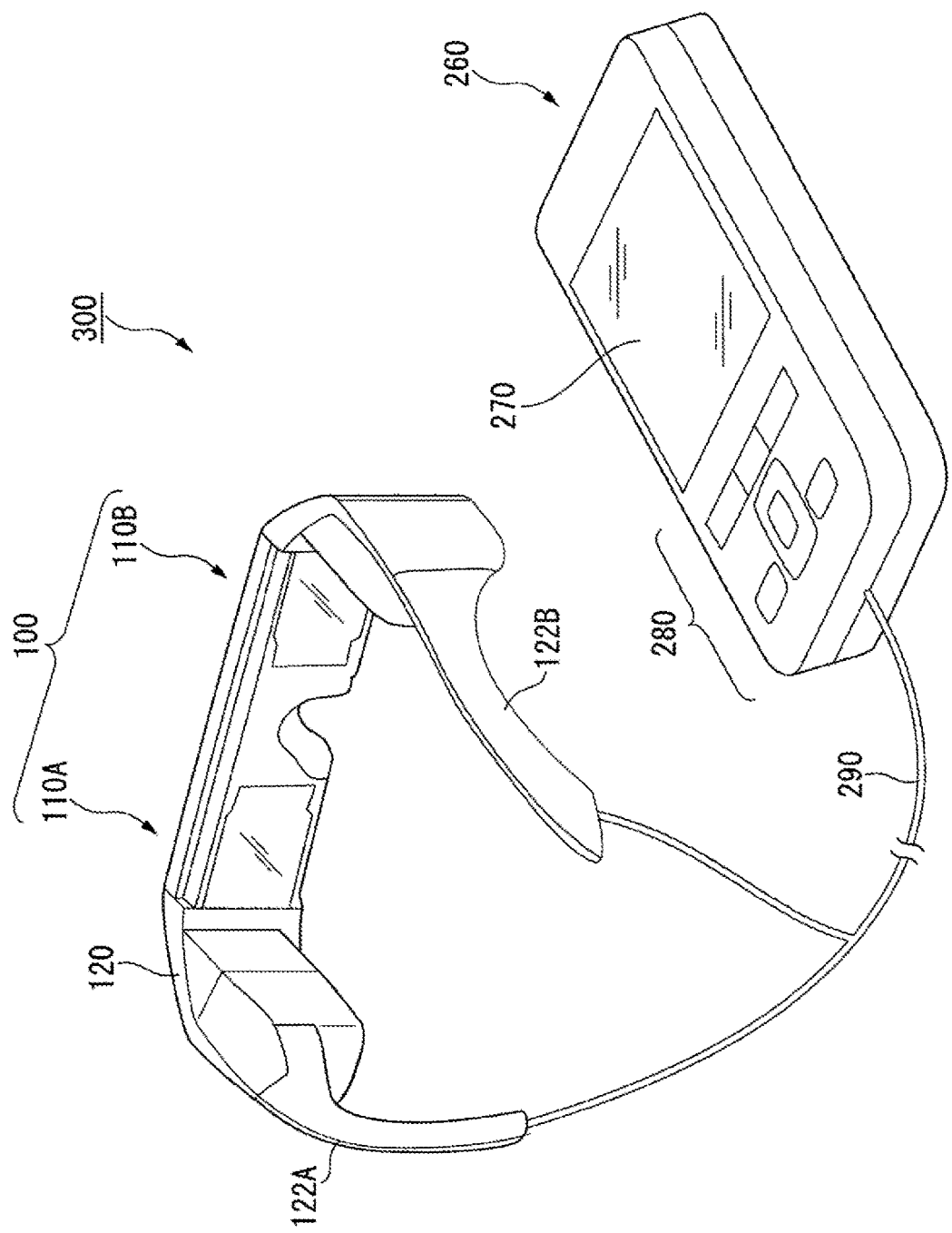
FIG. 2 is a perspective view of an HMD.

FIG. 1 is a diagram illustrating a user wearing an HMD according to this exemplary embodiment. FIG. 2 is a perspective view of the HMD according to this exemplary embodiment.

As illustrated in FIG. 1, an HMD 300 (head-mounted display apparatus) of this exemplary embodiment is used by being worn on the head of a user M as the user would wear eyeglasses. The HMD 300 of this exemplary embodiment is a non-transparent HMD that covers the eyes of the user.

As illustrated in FIG. 2, the HMD 300 includes a display unit 100 having an eyeglasses-like shape, and a controller 260 small enough for the user to be able to hold the controller 260 in his or her hand. The display unit 100 and the controller 260 are communicatively coupled by a wire or wirelessly. In this exemplary embodiment, each of a left-eye image display unit 110A and a right-eye image display unit 110B constituting the display unit 100, and the controller 260, are communicatively coupled by wire via a cable 290, and exchange image signals, control signals, and the like.

The display unit 100 includes a main frame 120, the left-eye image display unit 110A, and the right-eye image display unit 110B. The controller 260 includes a display screen 270 and an operation button unit 280.

The display screen 270 displays various types of information, instructions, and the like to provide to the user, for example. The main frame 120 includes a pair of temple portions 122A and 122B that rest on the ears of the user. The main frame 120 is a member for supporting the left-eye image display unit 110A and the right-eye image display unit 110B.

The right-eye image display unit 110B and the left-eye image display unit 110A have similar configurations, and the constituent elements inside both image display units are symmetrically disposed. Thus, in the following, the right-eye image display unit 110B is singly described in detail as an image display unit 110, and a description of the left-eye image display unit 110A is omitted.

Figure 3:
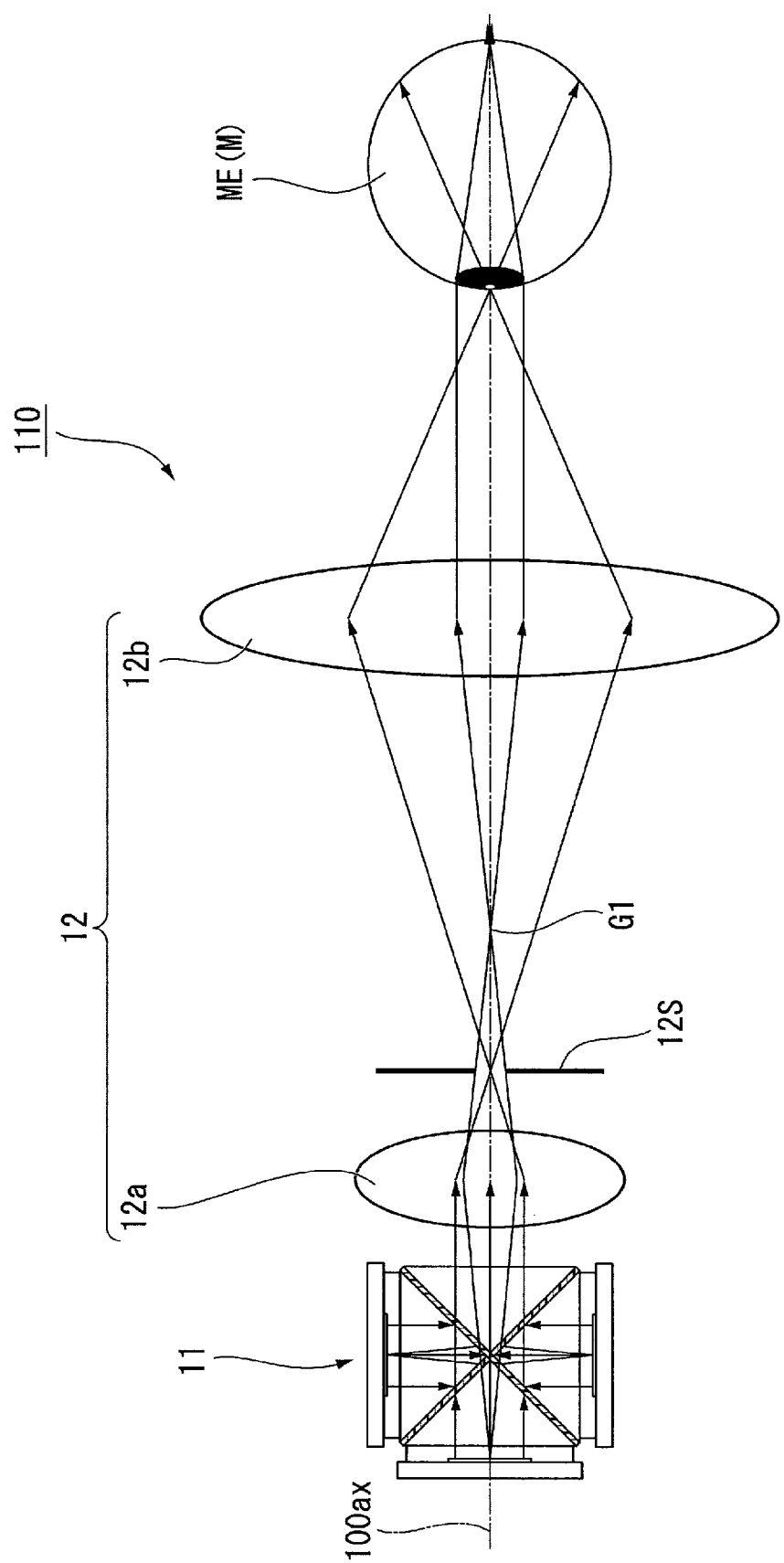
FIG. 3 is a diagram schematically illustrating the configuration of an image display unit.
Figure 4:
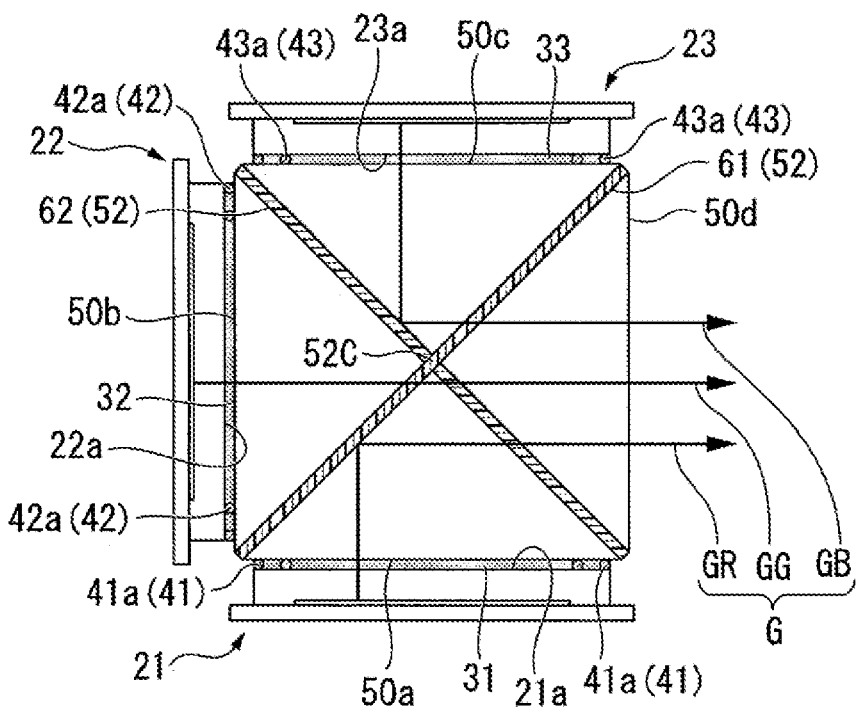
FIG. 4 is a diagram illustrating the configuration of a main part of the image display unit.

FIG. 3 is a diagram schematically illustrating the configuration of the image display unit. FIG. 4 is a diagram illustrating the configuration of main parts of the image display unit in an enlarged manner. Note that, in FIG. 3, a path extending through the center of a pupil of an eye ME of a user M and along which a ray of light forming a central angle of view of an observed image travels is defined as an optical axis 100ax.

As illustrated in FIG. 3, the image display unit 110 includes an image generating unit (optical module) 11 and a projection optical system 12. The image generating unit 11 emits image light that includes image information.

As illustrated in FIG. 4, the image generating unit 11 includes a red display panel (a first display panel) 21, a green display panel (a second display panel) 22, a blue display panel (a third display panel) 23, a cross dichroic prism 50, a first adhesive layer 31, a second adhesive layer 32, and a third adhesive layer 33.

In this exemplary embodiment, the red display panel 21, the green display panel 22, and the blue display panel 23 are constituted by organic EL panels. As will be described later, the red display panel 21, the green display panel 22, and the blue display panel 23 emit light in different wavelength bands, but otherwise have the same configurations.

The red display panel 21 emits red image light GR in a red wavelength band (e.g., from 620 nm to 750 nm).

The green display panel 22 emits green image light GG in a green wavelength band (e.g., from 495 nm to 570 nm).

The blue display panel 23 emits blue image light GB in a blue wavelength band (e.g., from 450 nm to 495 nm).

The cross dichroic prism 50 is an optical element that includes three incidence end planes where the blue image light GB, the green image light GG, and the red image light GR are respectively incident, and that generates color image light by synthesizing the light incident on each of those planes of incidence. In this exemplary embodiment, the blue image light GB, the green image light GG, and the red image light GR do not have polarization characteristics. This is because the blue image light GB, the green image light GG, and the red image light GR are light emitted from organic molecules disposed randomly throughout organic thin films, and thus basically have unpolarized light-emission characteristics, as opposed to the polarization characteristics of a liquid crystal display or the like.

The cross dichroic prism 50 has a square shape when viewed in a plan view, formed by bonding four triangular prisms 51 together so that the apexes of the prisms are located near a central part. An optical glass, for example, is used as the material of the triangular prisms. The cross dichroic prism 50 includes a joint part 52 where the four triangular prisms are bonded to each other. The joint part 52 has a substantially X-shaped planar shape, and a first dichroic film 61 and a second dichroic film 62 are provided at the joint part 52.

In this exemplary embodiment, the first dichroic film 61 and the second dichroic film 62 are provided to intersect at a 45° angle. As such, the first dichroic film 61 and the second dichroic film 62 intersect at a center 52C of the joint part 52. The first dichroic film 61 is formed in a continuous state at the area of intersection with the second dichroic film 62, whereas the second dichroic film 62 is formed to be divided at the center 52C of the joint part 52, which is the location of intersection with the first dichroic film 61. In other words, the second dichroic film 62 is formed to be separated by the first dichroic film 61. Note that the first dichroic film 61 may be separated by the second dichroic film 62 instead.

The cross dichroic prism 50 includes a first incident plane 50a on which the red image light GR emitted from the red display panel 21 is incident, a second incident plane 50b on which the green image light GG emitted from the green display panel 22 is incident, a third incident plane 50c on which the blue image light GB emitted from the blue display panel 23 is incident, and a light emitting plane 50d from which full-color synthesized image light G, obtained by synthesizing the blue image light GB, the green image light GG, and the red image light GR, is emitted.

The first dichroic film 61 transmits the red image light GR emitted from the red display panel 21 and the green image light GG emitted from the green display panel 22, but reflects the blue image light GB emitted from the blue display panel 23. The second dichroic film 62 transmits the green image light GG emitted from the green display panel 22 and the blue image light GB emitted from the blue display panel 23, but reflects the red image light GR emitted from the red display panel 21.

Based on this configuration, the cross dichroic prism 50 according to this exemplary embodiment is configured to emit, from the light emitting plane 50d, the synthesized image light G obtained by synthesizing the red image light GR emitted from the red display panel 21, the green image light GG emitted from the green display panel 22, and the blue image light GB emitted from the blue display panel 23.

As illustrated in FIG. 3, the synthesized image light G synthesized by the cross dichroic prism 50 is incident on the projection optical system 12. The projection optical system 12 includes a first lens 12a and a second lens 12b, for example. The projection optical system 12 is designed so that an intermediate image G1 of the synthesized image light G is generated by the first lens 12a, guided as substantially parallel light by the second lens 12b to the eye ME of the user M, and formed to an image on the retina.

The projection optical system 12 includes an aperture stop 12S located at substantially the rear focal point of the first lens 12a, and is therefore object-side telecentric. In the projection optical system 12, the second lens 12b forms an image of the aperture stop 12S near the position of the pupil of the eye ME of the user M, and thus the user M can observe a full angle of view.

The projection optical system 12 according to this exemplary embodiment has axial color aberration being corrected, and it is therefore assumed that the projection optical system 12 does not produce color aberration in the blue image light GB, the green image light GG, and the red image light GR constituting the synthesized image light G. Although the projection optical system 12 that has axial color aberration being corrected is typically constituted by three or more lenses, only the first lens 12a and the second lens 12b are illustrated in FIG. 3 for the sake of simplicity.

In this exemplary embodiment, the distances from each of the red display panel 21, the green display panel 22, and the blue display panel 23 (also referred simply as "the display panels" hereinafter) to the center of the cross dichroic prism 50 are set to appropriate values. Here, the center of the cross dichroic prism 50 corresponds to the center 52C of the joint part 52.

When the distances between each of the display panels and a central part of the cross dichroic prism 50 are not set to appropriate values, each instance of image light emitted from the light emitting plane 50d of the cross dichroic prism 50 (the blue image light GB, the green image light GG, and the red image light GR) will not be properly formed by the projection optical system 12 on the retina of the eye ME of the user M, and there is thus a risk that the user M will be unable to see high-quality images.

However, in the image generating unit 11 according to this exemplary embodiment, the red display panel 21, the green display panel 22, and the blue display panel 23 are fixed to the cross dichroic prism 50 at predetermined locations using the first adhesive layer 31, the second adhesive layer 32, and the third adhesive layer 33, respectively.

In this exemplary embodiment, the first adhesive layer 31 bonds the red display panel 21 to the cross dichroic prism 50. The second adhesive layer 32 bonds the green display panel 22 to the cross dichroic prism 50. The third adhesive layer 33 bonds the blue display panel 23 to the cross dichroic prism 50.

The red display panel 21 is bonded to the first incident plane 50a by the first adhesive layer 31, the green display panel 22 is bonded to the second incident plane 50b by the second adhesive layer 32, and the blue display panel 23 is bonded to the third incident plane 50c by the third adhesive layer 33.

The cross dichroic prism 50 according to this exemplary embodiment is assumed to be formed so that each of the distances from the first incident plane 50a, the second incident plane 50b, and the third incident plane 50c to the central part (the center 52C of the joint part 52) are equal.

In this exemplary embodiment, the first adhesive layer 31 contains a spacer member 41. The spacer member 41 is constituted by a plurality of spherical members (first spherical members) 41a. The spherical members 41a are constituted by glass beads having the same diameter.

In this exemplary embodiment, the second adhesive layer 32 contains a spacer member 42. The spacer member 42 is constituted by a plurality of spherical members (second spherical members) 42a. The spherical members 42a are constituted by glass beads having the same diameter as the spherical members 41a.

In this exemplary embodiment, the third adhesive layer 33 contains a spacer member 43. The spacer member 43 is constituted by a plurality of spherical members (third spherical members) 43a. The spherical members 43a are constituted by glass beads having the same diameter as the spherical members 41a.

Note that the same number of spherical members 41a, 42a, and 43a may be used, or different numbers may be used.

The plurality of spherical members 41a contact a surface 21a of the red display panel 21 and the first incident plane 50a of the cross dichroic prism 50. The plurality of spherical members 41a function as a spacer member that regulates the distance between the red display panel 21 and the cross dichroic prism 50.

The plurality of spherical members 42a contact a surface 22a of the green display panel 22 and the second incident plane 50b of the cross dichroic prism 50. The plurality of spherical members 42a function as a spacer member that regulates the distance between the green display panel 22 and the cross dichroic prism 50.

The plurality of spherical members 43a contact a surface 23a of the blue display panel 23 and the third incident plane 50c of the cross dichroic prism 50. The plurality of spherical members 43a function as a spacer member that regulates the distance between the blue display panel 23 and the cross dichroic prism 50.

In this exemplary embodiment, the plurality of spherical members 41a are disposed in a region where, in a plan view, the red display panel 21 does not overlap with a display region. Specifically, the first adhesive layer 31 is provided across the entire surface 21a of the red display panel 21. The first adhesive layer 31 is constituted mainly of a light-transmissive adhesive.

Figure 5:
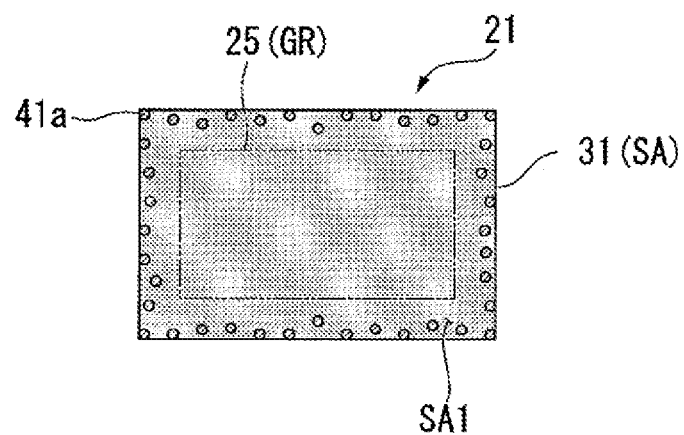
FIG. 5 is a diagram illustrating a bonding region of a red display panel in a plan view.

FIG. 5 is a diagram illustrating a bonding region of the red display panel in a plan view. As illustrated in FIG. 5, the red display panel 21 includes a display region 25 from which the red image light GR is emitted. The first adhesive layer 31 is disposed to cover the display region 25 of the red display panel 21, but the plurality of spherical members 41a are disposed in a region that, in a plan view, does not overlap with the display region 25. The plurality of spherical members 41a are selectively provided in a frame-shaped region SA1 which is a part of a bonding region SA, formed by the first adhesive layer 31, surrounding the display region 25. The spherical members 41a are not positioned on the display region 25, the red image light GR emitted from the display region 25 is not blocked or reflected by the spherical members 41a. Accordingly, the first adhesive layer 31 can suppress a situation where the red image light GR emitted from the red display panel 21 is lost.

Although not illustrated here, the same can be said of the plurality of spherical members 42a and the plurality of spherical members 43a as the plurality of spherical members 41a. The spacer member 42 (the plurality of spherical members 42a) is arranged in a region that, in a plan view, does not overlap with the display region of the green display panel 22, and thus the green image light GG is not blocked by the spherical members 42a. Accordingly, the second adhesive layer 32 can suppress a situation where the green image light GG emitted from the green display panel 22 is lost.

The spacer member 43 (the plurality of spherical members 43a) is arranged in a region that, in a plan view, does not overlap with the display region of the blue display panel 23, and thus the blue image light GB is not blocked by the spherical members 43a. Accordingly, the third adhesive layer 33 can suppress a situation where the blue image light GB emitted from the blue display panel 23 is lost.

According to the image generating unit 11 of this exemplary embodiment, the distance between the surface 21a of the red display panel 21 and the central part of the cross dichroic prism 50 (the center 52C of the joint part 52) can be adjusted with precision by appropriately adjusting the diameter of the plurality of spherical members 41a present in the first adhesive layer 31.

Additionally, the distance between the surface 22a of the green display panel 22 and the central part of the cross dichroic prism 50 (the center 52C of the joint part 52) can be adjusted with precision by appropriately adjusting the diameter of the plurality of spherical members 42a present in the second adhesive layer 32.

Furthermore, the distance between the surface 23a of the blue display panel 23 and the central part of the cross dichroic prism 50 (the center 52C of the joint part 52) can be adjusted with precision by appropriately adjusting the diameter of the plurality of spherical members 43a present in the third adhesive layer 33.

The image generating unit 11 according to this exemplary embodiment is manufactured by, for example, measuring the dimensions of the cross dichroic prism 50 after assembly, and then bonding the display panels to the cross dichroic prism 50 using adhesive layers containing spherical members having optimal diameters selected based on the measurement results.

According to the image generating unit 11 of this exemplary embodiment, the distances from the surfaces 21a, 21b, and 21c of the red display panel 21, the green display panel 22, and the blue display panel 23, respectively, to the light emitting plane 50d of the cross dichroic prism 50, can be set to be equal to each other.

Thus, according to the image generating unit 110 of this exemplary embodiment, the blue image light GB, the green image light GG, and the red image light GR can be favorably formed on the retina of the eye ME of the user M, and thus the user M can view a high-quality image (the synthesized image light G).

Although the foregoing exemplary embodiment describes the cross dichroic prism 50 as being formed so that each of the distances from the first incident plane 50a, the second incident plane 50b, and the third incident plane 50c to the central part (the center 52C of the joint part 52) are equal, as an example, there are situations where dimensional error of various components at the time of manufacturing produces variations in the distances from the central part of the cross dichroic prism 50 (the center 52C of the joint part 52) to each of the first incident plane 50a, the second incident plane 50b, and the third incident plane 50c.

In such a case, the distances from the surfaces of each of the display panels to the central part of the cross dichroic prism 50 (the center 52C of the joint part 52) can be adjusted with precision by using different diameters for all of the spherical members 41a, the spherical members 42a, and the spherical members 43a, or by having one of the spherical members 41a, the spherical members 42a, and the spherical members 43a to have a different diameter from the other two spherical members. Doing so eliminates the need to make the dimensions of the cross dichroic prism unreasonably precise, which improves the productivity of the image generating unit.

Additionally, although the foregoing exemplary embodiment describes a case where the first adhesive layer 31, the second adhesive layer 32, and the third adhesive layer 33 contain the spacer members 41, 42, and 43 (the spherical members 41a, the spherical members 42a, and the spherical members 43a), respectively, as an example, the configuration may be such that only one or two of the first adhesive layer 31, the second adhesive layer 32, and the third adhesive layer 33 include the spacer member.

For example, only the first adhesive layer 31 and the second adhesive layer 32 may include the spacer members 41 and (the spherical members 41a and the spherical members 42a). In this case, the diameters of the spherical members 41a and the spherical members 42a may be made the same as, or different from, each other, based on the distances from the surface of each of the display panels to the central part of the cross dichroic prism 50 (the center 52C of the joint part 52).

Exemplary Embodiment 2

An image display unit according to Exemplary Embodiment 2 of the disclosure will be described next. Elements that are the same as in Exemplary Embodiment 1 will be given the same reference signs, and detailed descriptions thereof will be omitted.

Figure 6:
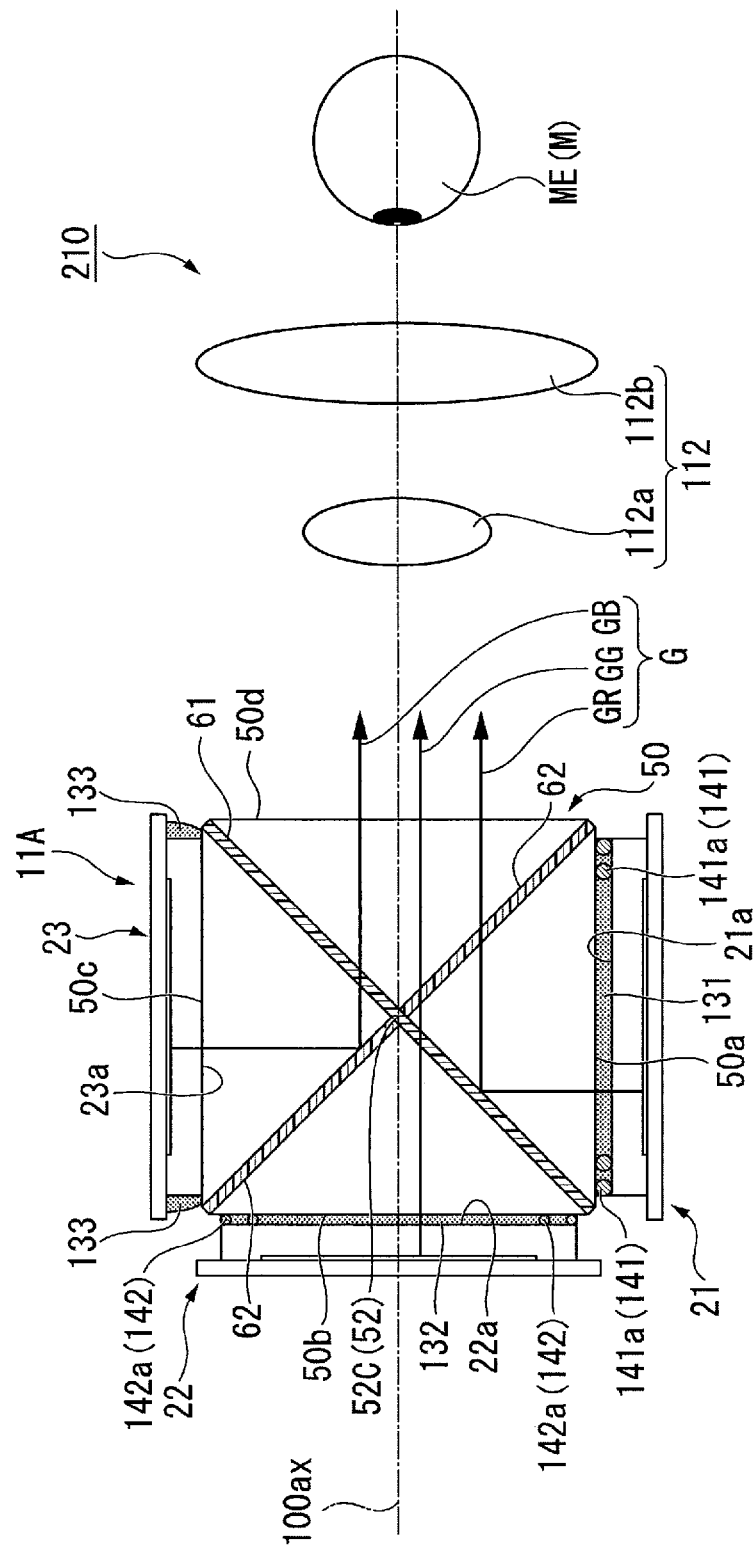
FIG. 6 is a diagram illustrating the configuration of an image display unit according to Exemplary Embodiment 2.

FIG. 6 is a diagram illustrating the configuration of the image display unit according to this exemplary embodiment.

As illustrated in FIG. 6, an image display unit 210 according to this exemplary embodiment includes an image generating unit 11A and a projection optical system 112. The image generating unit 11A includes the red display panel 21, the green display panel 22, the blue display panel 23, the cross dichroic prism 50, a first adhesive layer 131, a second adhesive layer 132, and a third adhesive layer 133.

The synthesized image light G synthesized by the cross dichroic prism 50 is incident on the projection optical system 112. The projection optical system 112 according to this exemplary embodiment differs from the projection optical system 12 according to the above-described exemplary embodiment in that the projection optical system 112 does not have axial color aberration corrected. As such, the projection optical system 112 according to this exemplary embodiment has a different back focus for each of red light, green light, and blue light.

Figure 7:
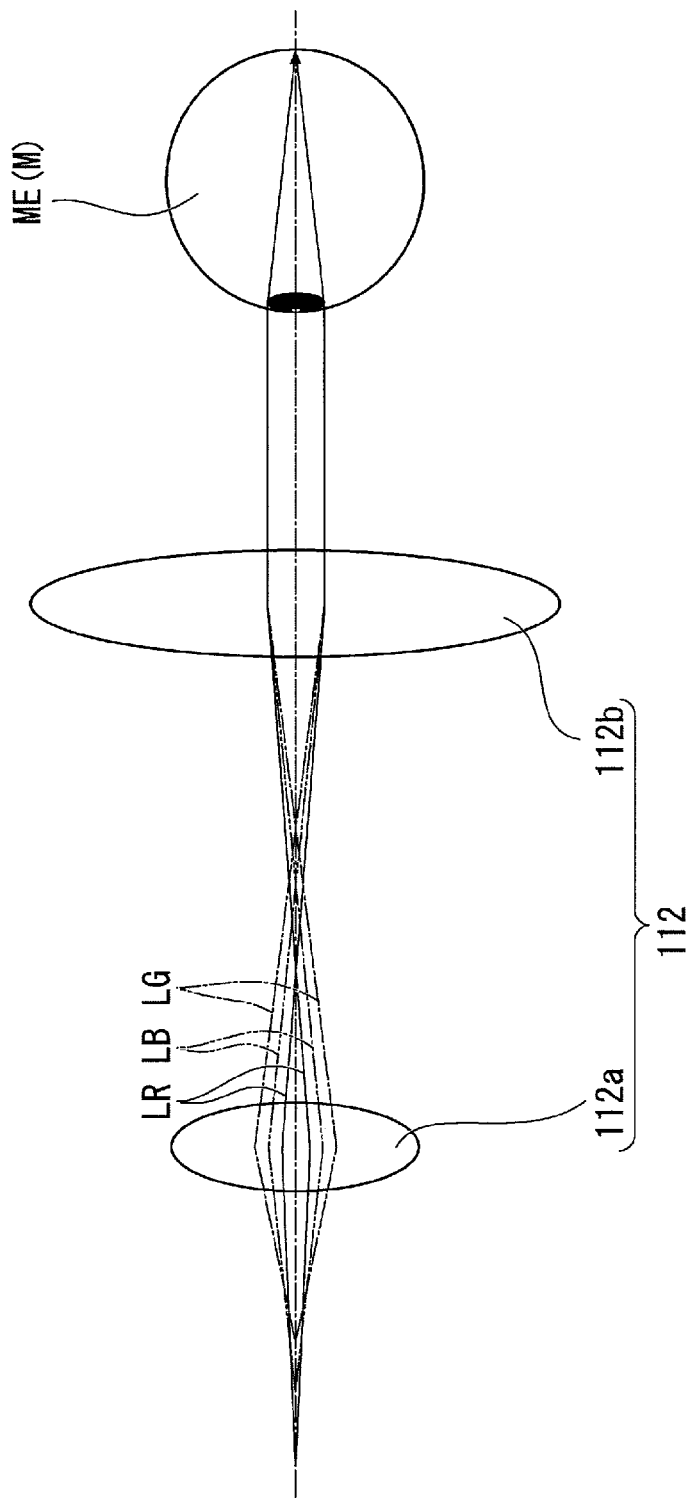
FIG. 7 is a diagram illustrating axial color aberration in a projection optical system according to Exemplary Embodiment 2.

FIG. 7 is a diagram illustrating axial color aberration in the projection optical system according to this exemplary embodiment. As illustrated in FIG. 7, the projection optical system 112 according to this exemplary embodiment includes a first lens 112a and a second lens 112b. In the projection optical system 112, the back focus is the longest for red light LR, the shortest for blue light LB, and for green light LG, has a value midway between the values for the red light LR and the blue light LB.

In other words, in the projection optical system 112, the back focus is the longest for the red image light GR in the same wavelength band as the red light LR, the shortest for the blue image light GB in the same wavelength band as the blue light LB, and has a value midway between the red image light GR and the blue image light GB for the green image light GG in the same wavelength band as the green light LG.

Thus to form a favorable image of the red image light GR, the green image light GG, and the blue image light GB on the retina of the eye ME of the user M, it is necessary to place each of the red display panel 21, the green display panel 22, and the blue display panel 23 at positions corresponding to the back focus (simply referred as "back focus positions" hereinafter) of each color produced by the projection optical system 112.

In the image generating unit 11A according to this exemplary embodiment, the red display panel 21, the green display panel 22, and the blue display panel 23 are arranged at the back focus positions of the respective colors by adjusting the distances from each of the red display panel 21, the green display panel 22, and the blue display panel 23 to the central part of the cross dichroic prism 50 (the center 52C of the joint part 52).

Specifically, in this exemplary embodiment, the blue display panel 23 is held to the cross dichroic prism 50 by the second adhesive layer 132, with the surface 23a of the blue display panel 23 in contact with the third incident plane 50c. The second adhesive layer 132 is provided spanning from part of a side surface 23b of the blue display panel 23 to the third incident plane 50c, without being interposed between the third incident plane 50c and the surface 23a. The cross dichroic prism 50 is designed to have a size that ensures that the position of emission of the blue image light GB (i.e., the surface 23a of the blue display panel 23) coincides with a position of the projection optical system 112 corresponding to the back focus position of the blue light LB.

As a result, the blue image light GB is emitted from a position of the projection optical system 112 corresponding to the back focus position. The projection optical system 112 can therefore form a favorable image of the blue image light GB on the retina of the eye ME of the user M.

The cross dichroic prism 50 according to this exemplary embodiment is assumed to be formed so that the distances from the first incident plane 50a, the second incident plane 50b, and the third incident plane 50c to the central part (the center 52C of the joint part 52) are equal.

The red display panel 21 is bonded to the first incident plane 50a by the first adhesive layer 131, and the green display panel 22 is bonded to the second incident plane 50b by the second adhesive layer 132.

The first adhesive layer 131 includes a spacer member 141. The spacer member 141 is constituted by a plurality of spherical members (first spherical members) 141a. The second adhesive layer 132 includes a spacer member 142. The spacer member 142 is constituted by a plurality of spherical members (second spherical members) 142a. Note that the spherical members 141a and the spherical members 142a are constituted by glass beads.

The plurality of spherical members 141a contact the surface 21a of the red display panel 21 and the first incident plane 50a of the cross dichroic prism 50. The surface 21a of the red display panel 21 is located at a position distanced from the first incident plane 50a by an amount equivalent to the diameter of the plurality of spherical members 141a. In other words, the position of emission of the red image light GR (i.e., the surface 21a of the red display panel 21) is located at a position further from the central part of the cross dichroic prism 50 (the center 52C of the joint part 52) than the position of emission of the blue image light GB (the surface 23a of the blue display panel 23).

In the image generating unit 11A according to this exemplary embodiment, the diameter of the spherical members 141a is set so that the position of emission of the red image light GR (the surface 21a of the red display panel 21) coincides with a position in the projection optical system 112 corresponding to the back focus position of the red light LR.

In this manner, the red image light GR is emitted from a position of the projection optical system 112 corresponding to the back focus position. The projection optical system 112 can therefore form a favorable image of the red image light GR on the retina of the eye ME of the user M.

The plurality of spherical members 142a contact a surface 22a of the green display panel 22 and the second incident plane 50b of the cross dichroic prism 50. The surface 22a of the green display panel 22 is located at a position distanced from the second incident plane 50b by an amount equivalent to the diameter of the plurality of spherical members 142a. In other words, the position of emission of the green image light GG (i.e., the surface 22a of the green display panel 22) is located at a position further from the central part of the cross dichroic prism 50 (the center 52C of the joint part 52) than the position of emission of the blue image light GB (the surface 23a of the blue display panel 23).

In the image generating unit 11A according to this exemplary embodiment, the diameter of the spherical members 142a is set so that the position of emission of the green image light GG (the surface 22a of the green display panel 22) coincides with a position in the projection optical system 112 corresponding to the back focus position of the green light LG. Note that because the back focus of the green light LG is shorter than the back focus of the red light LR, the diameter of the spherical members 142a is set to be smaller than the diameter of the spherical members 141a.

In this manner, with the image generating unit 11A according to this exemplary embodiment, the green image light GG is emitted from a position corresponding to the back focus position in the projection optical system 112. The projection optical system 112 can therefore form a favorable image of the green image light GG on the retina of the eye ME of the user M.

The image generating unit 11A according to this exemplary embodiment is manufactured by, for example, measuring the dimensions of the cross dichroic prism 50 after assembly, and then bonding the display panels via adhesive layers containing spherical members having diameters that compensate for differences in the back focus for each color of the projection optical system 112.

As described thus far, the image display unit 210 according to this exemplary embodiment includes the image generating unit 11A, which is provided with each of the display panels at positions correcting to different back focus positions produced by the axial color aberration of the projection optical system 112. Accordingly, images of the red image light GR, the green image light GG, and the blue image light GB can be favorably formed on the retina of the eye ME of the user M.

Additionally, with the image display unit 210 according to this exemplary embodiment, it is not necessary to use what is known as a "achromatic lenses", which have axial color aberration corrected, for the projection optical system 112. This makes it possible to make the projection optical system 112 smaller and lighter by reducing the number of lenses constituting the projection optical system 112.

Although this exemplary embodiment describes the cross dichroic prism 50, which is formed so that each of the distances from the first incident plane 50a, the second incident plane 50b, and the third incident plane 50c to the central part (the center 52C of the joint part 52) are equal, as an example, there are situations where dimensional error of various components at the time of manufacturing produces variations in the distances from the central part of the cross dichroic prism 50 (the center 52C of the joint part 52) to each of the first incident plane 50a, the second incident plane 50b, and the third incident plane 50c.

Figure 8:
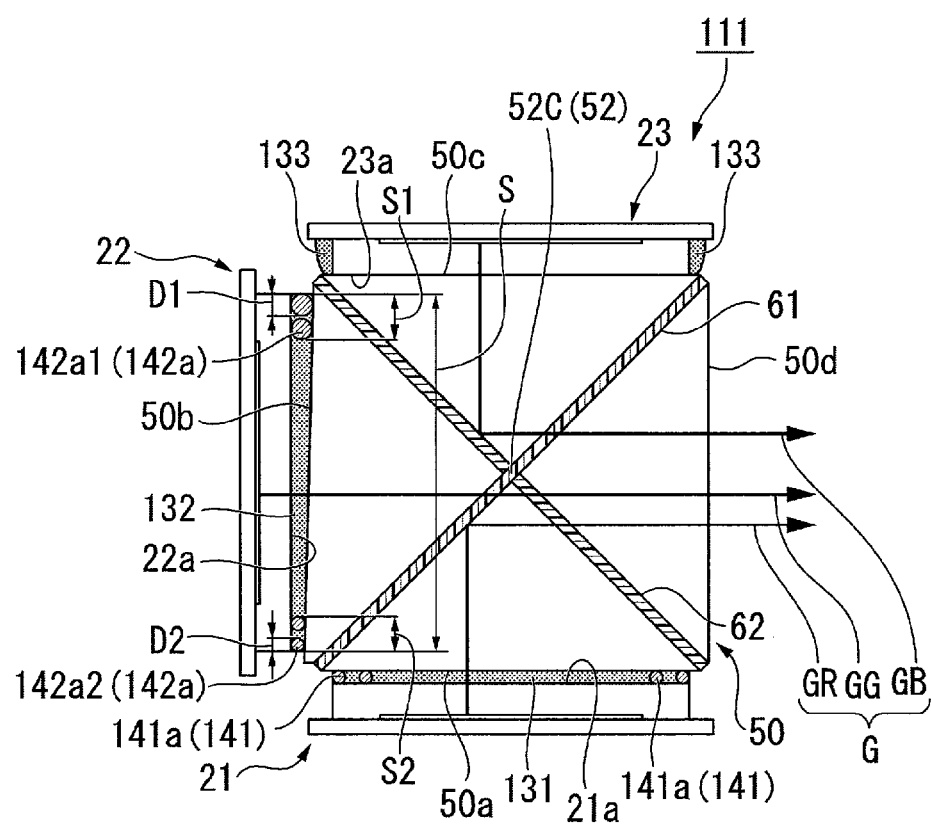
FIG. 8 is a diagram illustrating the configuration of an image display unit according to a modified example.

FIG. 8 is a diagram illustrating the configuration of an image generating unit according to a modified example.

In an image generating unit 111 illustrated in FIG. 8, the second incident plane 50b of the cross dichroic prism 50 is inclined. In this case, the diameter of the plurality of spherical members 142a present in the second adhesive layer 132 that bonds the second incident plane 50b and the green display panel 22 to each other may vary depending on the location in a bonding region S of the green display panel 22.

The plurality of spherical members 142a include first spherical members 142a1 and second spherical members 142a2. The first spherical members 142a1 are disposed in a first region S1 of the bonding region S in the green display panel 22. The second spherical members 142a2 are disposed in a second region S2 of the bonding region S in the green display panel 22. In the first region S1, the second incident plane 50b is inclined toward the center 52C of the joint part 52. Accordingly, the distance from the second incident plane 50b to the surface 22a of the green display panel 22 is relatively greater at the first region S1 than the second region S2.

The first spherical members 142a1 have a first outer diameter D1, and the second spherical members 142a2 have a second outer diameter D2. The first outer diameter D1 is greater than the second outer diameter D2. Specifically, the diameter of the first spherical members 142a1 is set to a size that fills a gap at the first region S1, and the diameter of the second spherical members 142a2 is set to a size that fills a gap at the second region S2. In other words, the diameter of the plurality of spherical members 142a provided within the bonding region S differs depending on the location in the bonding region S.

According to the present aspect, the green display panel 22 can be bonded to the second incident plane 50b in a state where the inclination of the second incident plane 50b is compensated for by the plurality of spherical members 142a present in the second adhesive layer 132. As such, even when the second incident plane 50b is inclined, the distance from the surface 22a of the green display panel 22 to the central part of the cross dichroic prism 50 (the center 52C of the joint part 52) can be set to a predetermined value, which makes it possible to favorably form an image of the green image light GG on the retina of the eye ME of the user M.

The foregoing describes a case where the second incident plane 50b is inclined as an example. However, when one or both of the first incident plane 50a and the third incident plane 50c are tilted, varying the diameters of the spherical members from location to location in the bonding region of the corresponding display panels makes it possible to set the distances from the surfaces of each of the display panels to the central part of the cross dichroic prism 50 to predetermined values as well.

Note that the technical scope of the present disclosure is not limited to the above-described exemplary embodiments, and various modifications can be made to the above-described exemplary embodiments without departing from the spirit and gist of the present disclosure.

For example, although the foregoing exemplary embodiments describe a case where an organic EL display element is used as each of the display panels, each of the display panels may be constituted by liquid crystal panels instead.

The entire disclosure of Japanese Patent Application No.:2018-124444, filed Jun. 29,2018 is expressly incorporated by reference herein.

What is claimed is:

1. An optical module comprising:
a cross dichroic prism;
a first display panel, a second display panel, and a third display panel;
a first adhesive layer configured to bond the first display panel to the cross dichroic prism;
a second adhesive layer configured to bond the second display panel to the cross dichroic prism; and
a third adhesive layer configured to bond the third display panel to the cross dichroic prism, wherein
at least one of the first adhesive layer, the second adhesive layer, and the third adhesive layer includes a spacer member.

2. The optical module according to claim 1, wherein
the first adhesive layer includes a first spherical member as the spacer member,
the second adhesive layer includes a second spherical member as the spacer member,
the third adhesive layer includes a third spherical member as the spacer member, and
diameters of at least two spherical members of the first spherical member, the second spherical member, and the third spherical member are the same or different from each other.

3. The optical module according to claim 1, wherein
the first adhesive layer includes a first spherical member as the spacer member,
the second adhesive layer includes a second spherical member as the spacer member,
the third adhesive layer includes a third spherical member as the spacer member,
at least one of the first spherical member, the second spherical member, and the third spherical member is provided in plurality within a bonding region of the corresponding display panel, and
diameters of the plurality of spherical members provided in the bonding region differ from location to location in the bonding region.

4. The optical module according to claim 1, wherein the spacer member is disposed in a region not overlapping, in a plan view, with a display region of the display panel.

5. A head-mounted display apparatus comprising:
the optical module according to claim 1; and
a projection optical system configured to project light from the optical module into an eye of a user.

* * * * *